April 27, 1965   J. R. FITZPATRICK   3,180,588
RIGID TYPE LIGHTER-THAN-AIR CRAFT
Original Filed June 29, 1962   5 Sheets-Sheet 1

INVENTOR.
JOHN R. FITZPATRICK
BY Albert Sperry
ATTORNEY

INVENTOR.
JOHN R. FITZPATRICK
BY Albert Sperry
ATTORNEY

April 27, 1965  J. R. FITZPATRICK  3,180,588
RIGID TYPE LIGHTER-THAN-AIR CRAFT
Original Filed June 29, 1962  5 Sheets-Sheet 3

INVENTOR.
JOHN R. FITZPATRICK
BY *Albert Sperry*
ATTORNEY

April 27, 1965    J. R. FITZPATRICK    3,180,588
RIGID TYPE LIGHTER-THAN-AIR CRAFT
Original Filed June 29, 1962    5 Sheets-Sheet 5

INVENTOR.
JOHN R. FITZPATRICK.
BY Albert Sperry
ATTORNEY 3,180,588
RIGID TYPE LIGHTER-THAN-AIR CRAFT
John R. Fitzpatrick, Levittown, Pa., assignor to Aereon
 Corporation, King of Prussia, Pa., a corporation of
 Pennsylvania
Continuation of application Ser. No. 206,384, June 29,
 1962. This application May 27, 1964, Ser. No. 371,876
18 Claims. (Cl. 244—25)

This application is a continuation of copending application Serial No. 206,384.

This invention relates to rigid type lighter-than-air craft and is directed particularly to airships which are of substantially greater width than height and possess improved ground handling and control characteristics.

Non-rigid lighter-than-air craft such as balloons and "blimps" embody a single cell or envelope which maintains its shape by reason of the pressure of the gases contained within the envelope. The absence of an extended framework within the envelope of such airships reduces the cost of producing the craft and increases their lifting capacity per unit of volume. However, the strong and relatively heavy material required to form an envelope capable of having the power plants and control car attached thereto or suspended therefrom affords but little weight advantage to non-rigid lighter-than-air craft over the rigid type airship. Moreover, the volume and size of non-rigid lighter-than-air craft is limited by reason of the very fact that the envelope has no structural framework. As a result, non-rigid aircraft heretofore have largely been confined to limited military and naval patrol and convoy uses together with advertising, some sightseeing, and experimental or research projects. They have not been designed or used for the large scale transportation of freight, troops or supplies.

Rigid types of lighter-than-air craft, such as the Zeppelin airships, can be made much larger and stronger than non-rigid aircraft, and they have already demonstrated their safety and advantages in the transportation of thousands of passengers and many tons of freight over long distances. The disasters which such rigid type lighter-than-air craft encountered were very spectacular, but the loss of life was far less than that experienced in comparable aeroplane crashes. Moreover, the failures of lighter-than-air craft were due in every case to the use of hydrogen as a buoyant gas or to the use of heavy and unyielding types of framework construction which failed when subjected to the forces encountered under adverse weather conditions.

Numerous inventors heretofore have suggested that lighter-than-air ships might be constructed so as to have an envelope which is of greater width than height, and they have attributed various advantages thereto. Thus, for example, Solomon Andrews Patent No. 43,449 shows and describes a lighter-than-air ship having three parallel gas envelopes of cylindrical form which are tapered at the front and rear. It utilized the force of gravity for propulsion and, for this purpose, the front of the airship was tilted upward and ballast was released so that the airship would glide forward as it ascended due to the greater air resistance offered in a vertical direction than in a horizontal direction Thereafter, when the airship had reached a suitable altitude, the front end of the ship was tilted downward and hydrogen was vented whereby the airship "coasted" forward as it descended. This type of undulating flight was also suggested by other inventors, but apparently was abandoned when portable motors and propulsion devices became available.

In more recent years, it has been suggested that lighter-than-air crafts having the usual power plant and propeller be constructed so as to have greater width than height in order to utilize the dynamic lift effect afforded during the forward movement of the airship. The patent to Tschudy No. 2,778,585 is typical of the latter type construction. However, it does not appear that any such airships were ever constructed or flown and both the early Andrews airship and the more recent dynamic lift airship designs have been suggested for use with non-rigid constructions embodying little or no structural framework for the envelope. In fact, the use of conventional types of airship framework in an envelope of greater width than height would not be feasible since the volume of such an envelope, as compared with the surface area of the envelope requiring structural support, is far less than that of the usual Zeppelin or elongated single hull envelope.

In accordance with the present invention, these difficulties and limitations encountered in prior rigid and non-rigid types of lighter-than-air ships are overcome and novel rigid type lighter-than-air ships are provided having two or more envelopes for the buoyant gas, and such envelopes are arranged so as to present a greater width than height whereby any advantages attainable by utilization of the Andrews propulsion theory or the dynamic lift principle of more recent patents can be utilized. The envelopes of such aircraft are provided with a framework of novel construction and design which is extremely light in weight and serves to maintain the desirable structural integrity of the airship while affording the requisite yielding characteristics to prevent destruction of the framework even when subjected to sever weather conditions and forces such as those which destroyed the Zeppelin airships of the 1930's. Furthermore, lighter-than-air ships embodying the present invention posses important advantages in their improved handling on the ground and in the air by reason of a novel arrangement and relation of the center of buoyancy, the center of gravity, and the point or locus of support for the load carried by the airship.

The airships of the present invention may employ helium or other non-flammable gases or gas mixtures so that the hazards theretofore encountered by reason of the use of hydrogen as a buoyant gas can be eliminated. Moreover, since the airship presents a relatively small side area compared with its volume, it is not subject to the difficulties in control on the ground due to the wind effects and lateral air currents. The wide spacing or track afforded for the landing gear gives the airship much more stability when on the ground. It may be housed in hangars of relatively low height and does not require the use of the usual mooring mast which was necessary for use with conventional dirigible type lighter-than-air craft.

Airships embodying the present invention have a further advantage in that they may be constructed in effect as a "flying wing" of low aspect ratio which affords extremely low loading per unit of horizontal area and at the same time reduces the aerodynamic drag by reason of the reduced boundary layer resistance and the limited virtual mass of the airship when in flight.

It is, accordingly, an object of the present invention to provide novel rigid types of lighter-than-air craft possessing improved ground handling characteristics together with improved flight and control characteristics.

It is a further object of the invention to provide rigid type lighter-than-air craft which embody a structural framework for the envelope or envelopes of the airship which is relatively light in weight and possesses great strength while affording sufficient yielding characteristics to enable the airship and its framework to withstand the severe strains and forces which the airship may encounter due to adverse weather conditions.

A specific object of the present invention is to provide novel rigid type lighter-than-air craft which are of greater width than height and possess a relatively low aspect ratio with improved boundary layer control.

These and other objects and features of the present invention will appear from the following description thereof wherein reference is made to the figures of the accompanying drawings.

Figure 1:
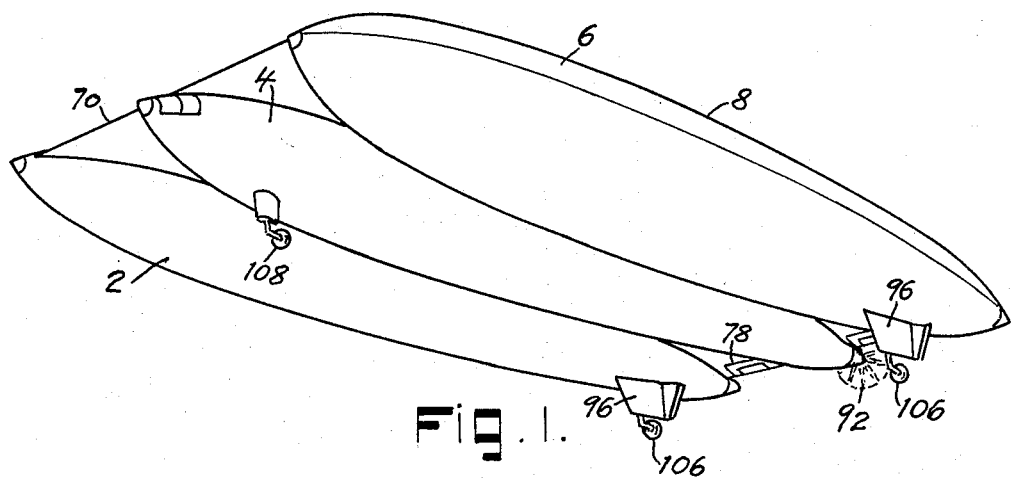
FIG. 1 is a perspective illustrating a typical embodiment of the present invention.

In that form of the invention chosen for purposes of illustration in FIGS. 1 to 8, the airship embodies the three hulls 2, 4 and 6 which are arranged side by side. Each hull includes a framework which is preferably enclosed entirely within an outer envelope of covering material 8 which may be formed of fabric, plastic, sheet metal, or any other suitable or preferred material.

The framework structures of the hulls 2, 4 and 6 are preferably of the type shown and described in U.S. Patent No. 3,129,911. Thus, they each embody a plurality of ring-like assemblies 10 which are spaced longitudinally of the framework and are held in place by longerons 12. Each ring assembly comprises outer peripheral bracing members 14 which serve to hold the longerons 12 in circumferentially spaced relation and is provided with a plurality of radially extending tension members 16 which are connected to a concentration ring or other member 18 located at or adjacent the longitudinal axis 20 of the framework. Any suitable member of the ring-like assemblies may be employed and the peripheral bracing members 14 between the longerons actually constitute the sides of a many-sided polygon rather than a true ring. Further, as described more fully in said co-pending application, the ring assemblies 10 are prevented from buckling or being distorted and instead are held in a single plane normal to the axis 20 of the framework by the construction provided. For this purpose, king posts 22 extend radially inward from the longerons 12 which are connected to the peripheral bracing members 14. Diagonal bracing members 24 and 26 extend from the longerons 12 to points 28 midway of the length of the king posts 22 crossing at the points 30. The tension members 16, which are preferably formed of wire or other material characterized by its light weight but high tensile strength, are connected to the inner ends of the king posts 22 and extend to the concentration rings 18.

With this construction, the ring assemblies 10 are similar to a bicycle wheel or the like in that all loading of the concentration ring 18 is transmitted to and distributed throughout the periphery of the ring assembly through light-weight tension elements or spokes and few, if any, compressional forces are encountered. Moreover, the king posts 22 will serve as levers of the second class since their outer ends are fixed in position to serve as fulcrums by reason of their connection to the longerons 12 at the ends of each of the peripheral braces 14. As a result, any tendency for the diagonal bracing members 26 to buckle or be displaced axially with respect to the framework, to a position such as that indicated in dotted lines at 22A in FIG. 5, will be opposed by the tension or radially directed inward pull of the tension member 16 and the concentration ring 18. Furthermore, since the point at which the diagonal braces 26 will tend to exert a buckling force or axially directed load on the lever of the king posts will be at the intermediate or mid-points 28 of the king posts where the diagonal braces 26 are connected to the king post. The length of the "resistance arm" of such a second class lever, represented by the distances from the longeron 12 which serves as the fulcrum of the king post to the joint or point of loading 28 of the king post is, of course, less than, and preferably about one-half, the full length of the "effort arm" of the king post lever 22. Therefore, the tension or force required to prevent axial displacement of the inner ends 32 of the king posts (and buckling of the ring assemblies 10) will be less, and preferably no more than one-half the axially directed load or buckling force applied at the intermediate points 28 on the king posts. Furthermore, the displacement or distance which the inner ends 32 of the king post will move in an axial direction will vary by an amount equal to twice the sine of the angle $\theta$ through which the king post lever is rotated about its fulcrum. Therefore, since the sine of an angle $\theta$ increased rapidly as the angle increases, the second class lever construction of the king posts permits the assembly to yield somewhat or move to a limited degree while presenting greatly increased resistance to movement of the king posts through a large angle sufficient to result in actual distortion of any ring assembly 10.

The construction thus provided serves to assure the retention of the ring assemblies 10 in positions normal to the axis of the envelope so as to develop and maintain the maximum strength in the framework assembly with a minimum weight. Nevertheless, the framework assembly still possesses the ability to yield sufficiently to afford what might be called "toughness" of structure and prevent fracture or rupture of the elements when the airship is subjected to the strains and force encountered under adverse weather conditions.

The framework supporting the envelopes is also strengthened by the use of diagonally extending bracing wires 34 which may be connected to the ring assemblies 10 and intermediate ring structures 36 by means of gusset plates or otherwise. In this way, stresses or tensions applied to any element of the framework structure are distributed so that they do not accumulate or become localized so as to present a dangerous situation. Nevertheless, the framework assembly for each of the envelopes 2, 4 and 6 possesses great strength while being extremely light in weight and possessing the requisite resiliency or toughness to prevent fracture or destruction of the framework under extreme tension or stresses.

The ring assemblies 10 with their radially extending tension members 16 serve to divide each of the hulls 2, 4 and 6 into a plurality of adjacent and longitudinally arranged compartments or chambers in which cells 58 for receiving buoyant gas may be located. The ring assemblies 10 of the various hulls are preferably spaced apart similar distances longitudinally of the framework in each hull. When so arranged, a ring assembly 10 in each of the hulls 2, 4 and 6 will be located in a common vertical plane spaced longitudinally of the hulls and positioned at right angles to the common horizontal plane including the longitudinal axes 20 of the hulls.

Figure 3:
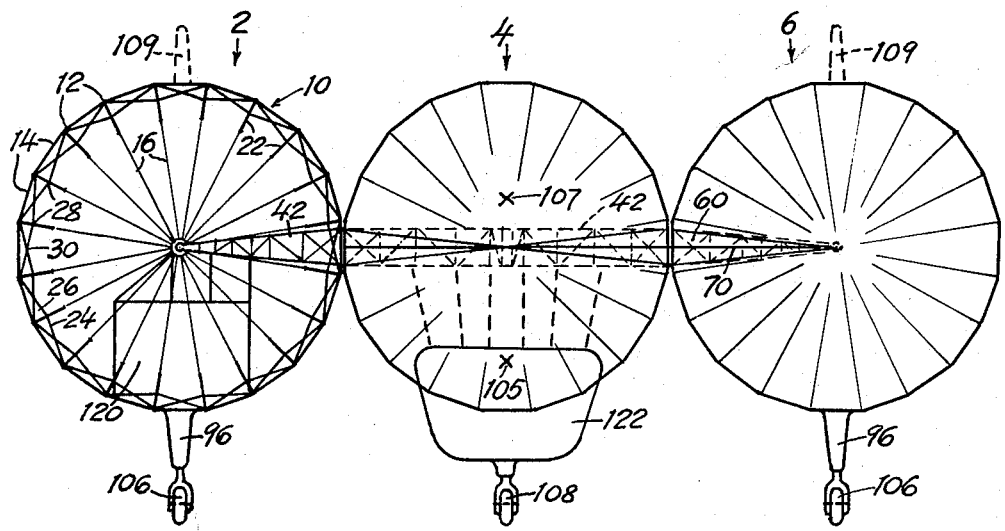
FIG. 3 is a front view partly in section showing the construction of FIGS. 1 and 2.
Figure 5:
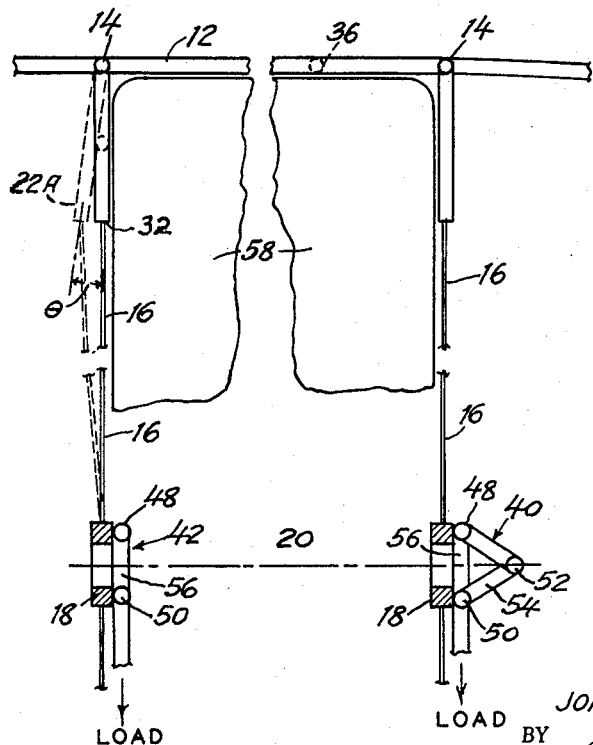
FIG. 5 is a further enlarged view of a portion of the construction shown in FIG. 4 taken on the line 5—5.
Figure 4:
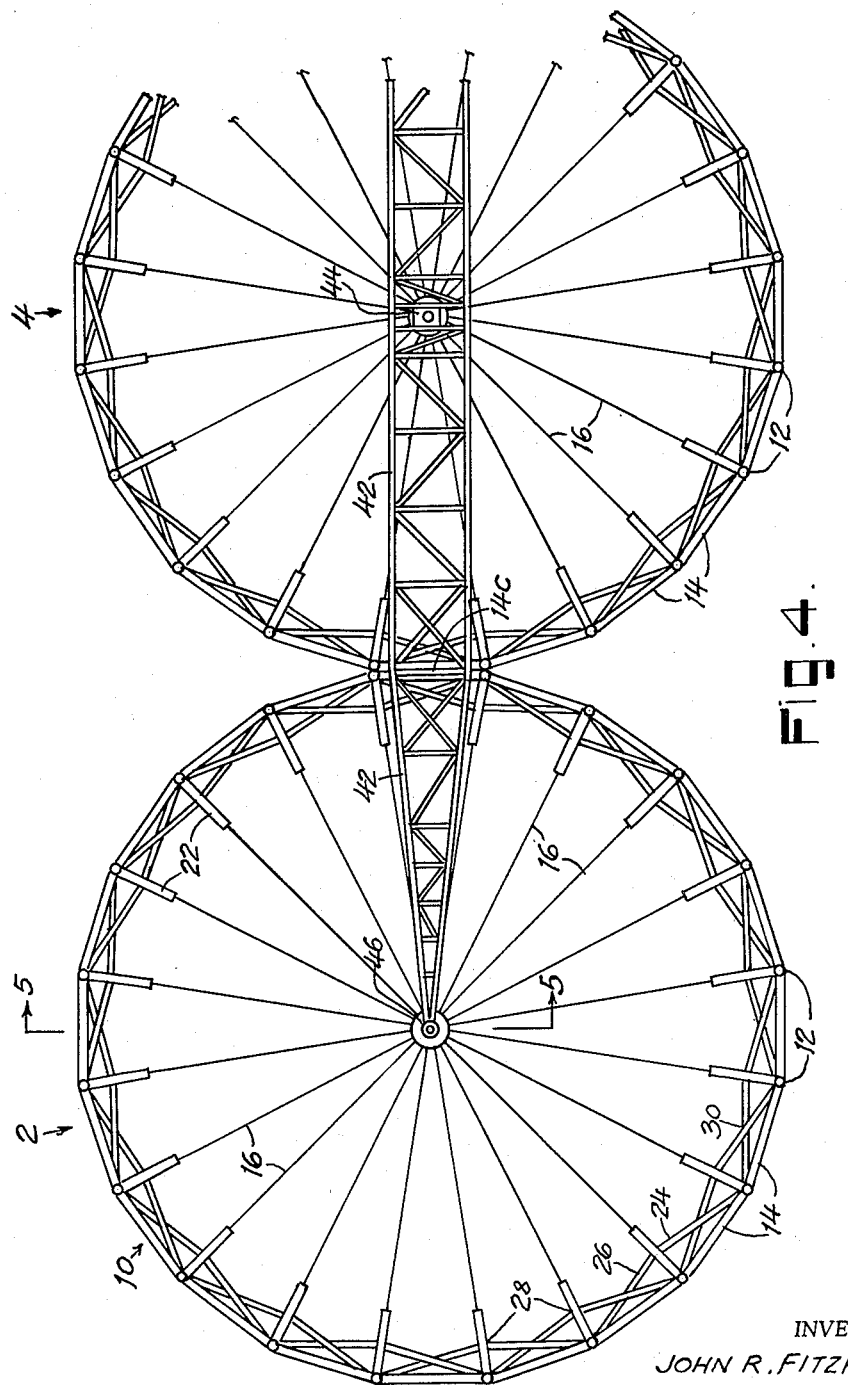
FIG. 4 is an enlarged view of a portion of the construction shown in FIG. 3.
Figure 6:
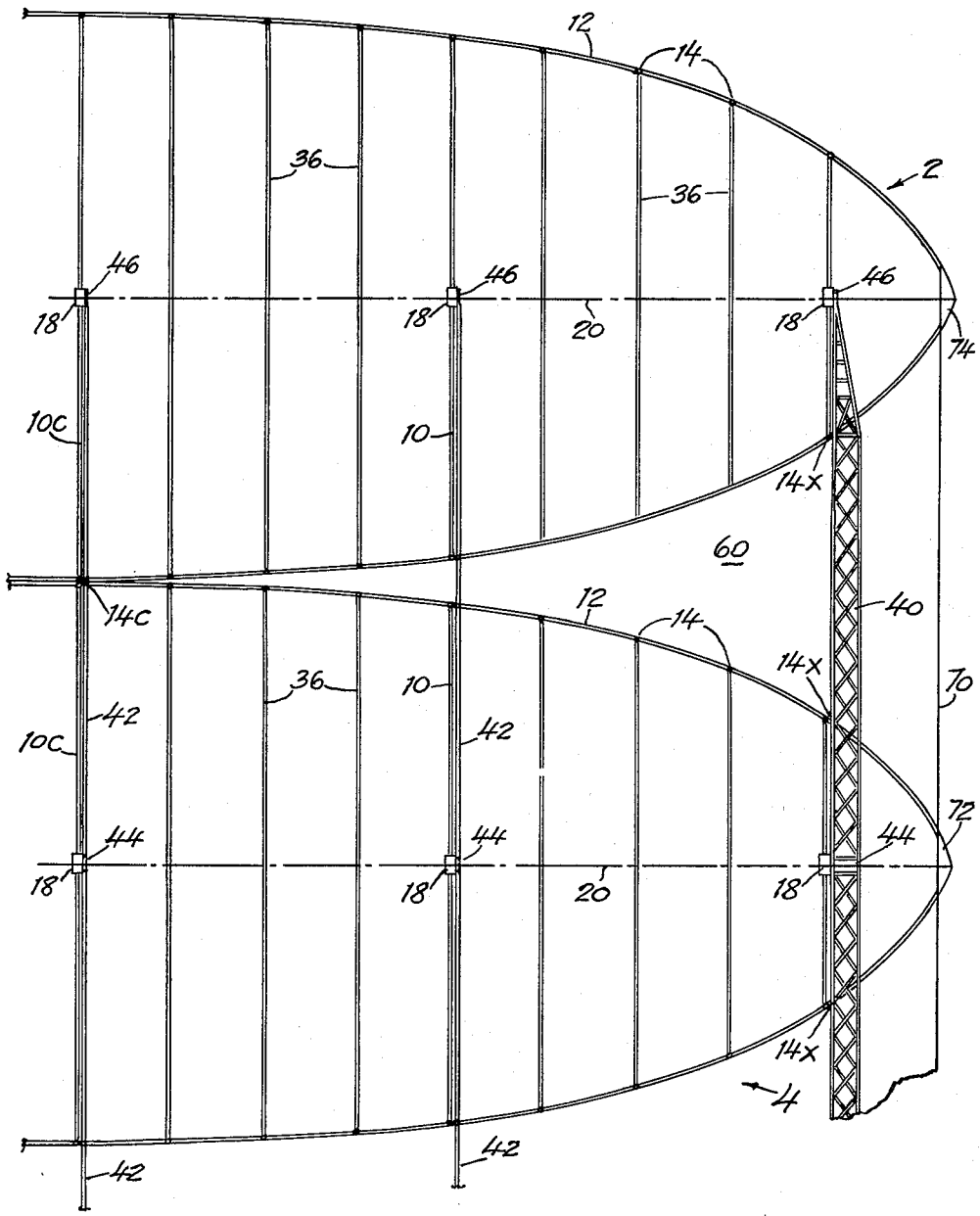
FIG. 6 is an enlarged plan view of a portion of the construction shown in FIG. 2.
Figure 7:
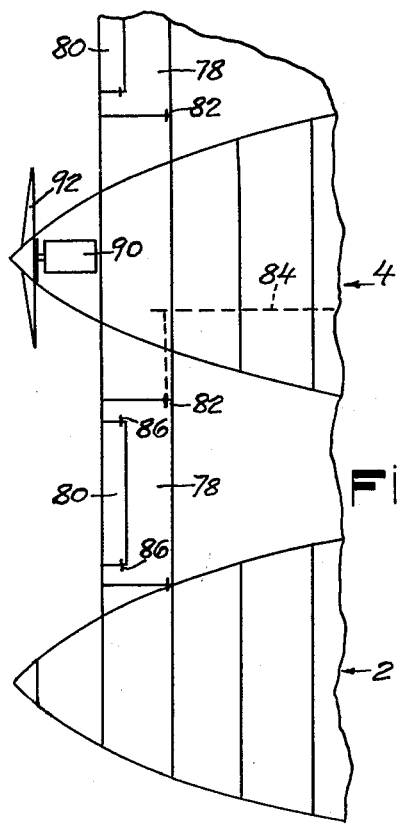
FIG. 7 is an enlarged plan view of a part of the tail portion of the airship illustrated in FIGS. 1 to 6.

In accordance with the present invention, the framework structures of the envelopes 2, 4 and 6 are held in fixed relative positions in the airship assembly by means of transversely extending cross beams such as those shown at 40 and 42 in FIGS. 3, 4 and 5. These cross beams then can be located at the intersections of the various vertical planes including the ring assemblies 10 with the horizontal plane including the longitudinal axes 20 of the various hulls.

Each cross beam is provided at its center with an attaching plate 44 and has a further attaching plate 46 located adjacent each of its ends. The attaching plates 44 located in the centers of the cross beams 40 and 42 are bolted or otherwise secured to the concentration rings 18 adjacent the longitudinal axis of the central framework assembly 4 of the airship. In a similar way, the attaching plates 46 adjacent the ends of the cross beams 40 and 42 are welded or otherwise secured to the concentration rings 18 located on the longitudinal axes of the outer framework assemblies 2 and 6.

The cross beams 40 which are secured to the concentration rings 18 of the foremost and rearmost ring assemblies 10 of the framework assembly are preferably triangular in cross section as shown in FIG. 5. Thus, the upper and lower rails, tubes, or elements 48 and 50 of the cross-beams 40 are connected to the rail 52 by truss members 54 and are similarly connected to each other by truss members 56. The rail 52 of the cross beam 40 secured to the foremost ring assembly of each of the frameworks 2, 4 and 6 is therefore located in front of the ring assemblies whereas the rail 52 of the cross beam 40 secured to the rearmost ring assemblies is located at the rear thereof. This is rendered possible since there are no gas cells in the front and rear ends of the envelopes.

On the other hand, the cross-beams 42 which are connected to the intermediate ring assemblies of the frameworks are designed to extend transversely of the framework assemblies 2, 4 and 6 and between the cells 58 which contain helium or other buoyant gas. Therefore, the cross-beams 42 embody only the upper and lower rails 48 and 50 with their truss members 56 and are positioned so as to lie in vertical planes between the gas cells 58 while extending horizontally from the concentration rings 18 of the outer framework assembly 2, past the concentration rings of the central framework assembly 4 to the concentration rings 18 of opposite outer framework assembly 6 of the airship.

Figure 2:
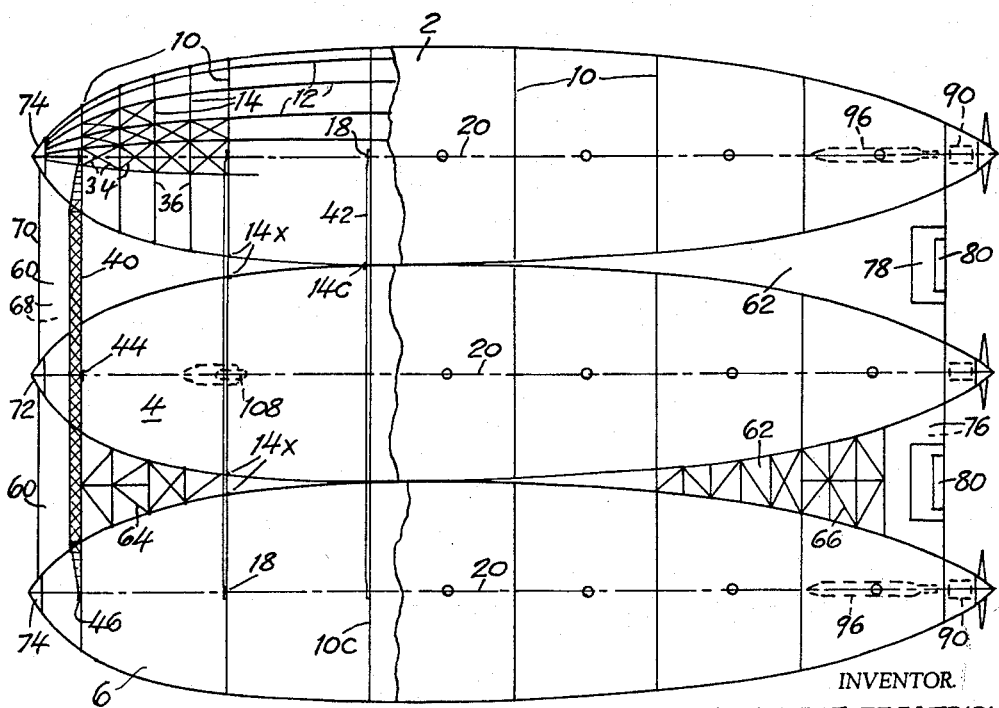
FIG. 2 is a top plan view of that form of the invention illustrated in FIG. 1.

The frame of the airship thus embodies the three framework assemblies 2, 4 and 6, and these framework assemblies are arranged with their longitudinal axes 20 parallel and lying in the same horizontal plane. The cross-beams 40 and 42 are located in the same horizontal plane as the longitudinal axes 20 of the hulls 2, 4 and 6, and are located in a vertical plane including one ring assembly 10 of each hull. The cross beams further are so connected to the framework of each hull that the load applied to the cross-beams is transmitter to and distributed throughout all three hulls and the ring assemblies, longerons, diagonal bracing wires, and other elements thereof. In order to assure such distribution of the load and in order to avoid any shifting of one framework with respect to the others, the cross-beams 40 and 42 are secured to the peripheral bracing members 14 at the opposite sides of the ring assemblies 10 of the central framework 4 and to the adjacent peripheral bracing members 14 at the inner sides of the outer ring assemblies 10 of the frameworks 2 and 6. The cross-beams are preferably clamped to the peripheral bracing members 14 at the points 14X where they contact the bracing members in the assembly, but they may be welded or otherwise secured together if desired. In particular, the peripheral bracing members 14C of the ring assemblies 10C, which are of the largest diameter in each framework and are in contact with each other as shown in FIGS. 2 and 4, may be welded together or otherwise positively secured together. In this way, it is possible to prevent relative rotation of any hull or framework about its longitudinal axis 20 or longitudinal shifting of any framework with respect to the framework of any other hull in the airship.

Such relative movement or displacement of the hulls with respect to each other is further prevented by fillets 60 which span the area between the nose portions of the framework assemblies 2, 4 and 6 in advance of the ring assemblies 10C. In a similar way, fillets 62 span the area between the portions of the framework assemblies rearwardly from the ring assemblies 10C. These fillets are located in the plane of the axes 20 of the framework assemblies 2, 4 and 6 and are provided with structural framework elements 64 and 66 which further aid in securing the three frameworks of the hulls in fixed relative positions with their axes parallel and in the same plane. The fillets 60 in advance of the ring assemblies 10C are provided with upper and lower airfoil surfaces 68 which are inclined forwardly from the upper and lower extremities of the contacting bracing members 14C to the leading edge 70 which lies in the plane of the axes 20 of the framework assemblies 2, 4 and 6. The leading edges 70 of the fillets 60 preferably extend transversely and horizontally from the nose 72 of the central framework assembly 4 to the noses 74 of the outer framework assemblies 2 and 6.

The fillets 62 at the rear of the ring assemblies 10C may be similarly formed with upper and lower airfoil surfaces 76 which further include elevators 78 and trailing edge flaps 80. The elevators 78 may be pivotally mounted at 82 for vertical movement under control of a cable or operating element 84. The aelerons or trailing edge flaps 80 may in turn be mounted at 86 for pivotal movement with respect to the elevators 78.

The depth of the nose fillets 60 increases gradually from the leading edge 70 thereof to the peripheral brace 10C and the upper end lower surfaces 68 thereof cooperate with the contour of the upper and lower surfaces 76 of the rear fillets 62 to provide a smooth curving surface between the hulls 2, 4 and 6 whereby a minimum of air resistance, turbulence and drag will be presented and the boundary layer effect is materially reduced.

It will also be apparent that the use of multiple hulls or envelopes arranged side by side in parallel relation renders it possible to provide an assembly which is relatively wide and short as compared with conventional rigid airships such as a Zeppelin. In this way, the aircraft may be constructed so as to have a very low aspect ratio, i.e., a span/chord ratio of about say, 1.0 to 0.3, whereby the boundary layer effect and the drag of the airship are materially reduced. Therefore, higher speeds may be attained and it is anticipated that at least some of the propulsion effects described in the Solomon Andrews patent may be attained. Moreover, the aerodynamic lift mentioned in prior art patents also may be utilized. It is, in fact, possible to utilize the effects and advantages contemplated by such prior inventors to a far greater extent in rigid type lighter-than-air craft than would be possible in non-rigid airships since relative displacement or movement of the various hulls in the assembly with respect to others is prevented by the applicant's framework assembly and the relative rigidity of the airship as compared with the non-rigid aircraft of the prior art.

Airships embodying the present invention are provided with propulsion means and as illustrated, a power plant 90 and propeller 92 may be mounted at the rear of each of the framework assemblies 2, 4 and 6. Such propulsion means may be of any suitable or preferred type such as a jet, if desired, and the power plant may be an internal combustion engine, turbine, electric motor or an atomic powered device. In fact, it is generally recognized that any atomic powered aircraft using reactors or fission means of the character known or foreseen today must of necessity be a lighter-than-air craft, since the power required and the proximity of the reactor to the passenger and pilot areas of other craft requires the use of such heavy lead shielding as to increase the weight of the power plant beyond that which can be carried by any other type of aircraft.

Furthermore, as pointed out in U.S. Patent No. 3,129,-911, the framework assemblies of the hulls employed in the present invention permit location of the propulsion means in alignment with the longitudinal axis 20 of each or any hull whereby the propulsion forces do not have to be offset or compensated for due to eccentric location thereof.

While each hull and framework assembly of the aircraft as illustrated is provided with propulsion means, it will be apparent that a single propulsion device may be provided at the rear of the central framework assembly 4. In the alternative, two propulsion devices may be used and can be mounted on the two outer framework assemblies 2 and 6. When the propulsion means are carried by the outer hulls 2 and 6, they serve to afford easier and more positive control of the aircraft by reason of their relatively wide spacing and the leverage afforded by their displacement from the central axis of the aircraft. This spacing of the power plants in combination with the relatively small aspect ratio of the ship renders it possible to maneuver the aircraft and provide more sensitive control of both in the air and on the ground.

Maneuvering or steering of the aircraft is also sided by the use of stabilizers or tail fins 96 which as shown, project vertically downward from the outer framework assemblies 2 and 6 in the same vertical plane as the central axis 20 of each hull. At the rear of each of the stabilizer fins 96 there is a rudder member 98 which is movable horizontally about a rudder post 100. A rudder flap 102 is pivotally mounted along the rear edge of the rudder 98 and is actuated by lever mechanism 104 connected to the rudder post 100. Displacement of the rudder flap 102 to one side or the other of the plane of the rudder 98 is effected by manipulation of the rudder post 100 and lever mechanism 104 whereby the rudder is urged in the opposite direction to steer the airship while in flight.

The tail fin assembly also is utilized as landing gear for the airship; and for this purpose, landing wheels 106 are mounted below each tail fin and are connected to the rudder post 100 for movement thereby to steer or maneuver the airship when on the ground. At the same time, a single landing wheel 108 is mounted below the central framework assembly 4 near the front of the airship so that a tricycle landing means of extended area is provided.

The construction thus provided serves to increase the stability of the airship while on the ground since there are no upwardly projecting stabilizers or fins. The tail fin assemblies instead project downward and are held against undesired lateral movement by engagement of the landing wheels 106 with the ground. The use of upwardly extending fins or rudders is not necessary so that the over-all height of the airship may be relatively limited. Moreover, the center of gravity of the ship indicated at 105 in FIG. 3 is below the center of buoyancy indicated at 107 in FIG. 3. The leverage or laterally directed component of forces which will be exerted on the stabilizing fins by any cross winds and which might tend to rotate the ship about its central longitudinal axis will be substantially less than that which would be presented if the stabilizer fins projected upwardly and were located above the center of buoyancy and farther from the center of gravity as shown in dotted lines at 109 in FIG. 3. Therefore, cross winds and side currents which tend to cause the tail of the airship to swing freely or in an uncontrolled manner or to cause "kiting" of the airship have little or no effect on airships of the present invention. Moreover, the wide spacing and area of support afforded by the spaced landing wheels 106 and 108 together with the limited aspect ratio of the ship render it possible to support and maneuver the airship very readily when it is on or near the ground.

In much the same way, control and manipulation of the airship when in flight is facilitated. This advantage is enhanced by reason of the fact that the center of gravity of the airship and the stabilizing fins 96 are both located below the center of buoyancy of the airship (which will be located within the cells 58 which contain the buoyant gas). When this relation of the elements is maintained, any laterally directed forces exerted on the stabilizing fins 96 will be applied at points relatively close to the center of gravity where the leverage tending to cause the ship to rotate about its longitudinal axis or its center of buoyancy is very limited. Therefore, control of the airship when in flight is simplified and greater stability of the airship in turbulent air is assured.

The airship shown in FIGS. 1 to 8 and described above is characterized by its stability and safety whereas the propulsion effects attainable by inclined flight using the Andrews propulsion principle will more than offset the increase in weight of the framework incidental to the use of a plurality of envelopes. In fact, when employing the novel type of framework structure described, the total weight necessary to attain the desired strength will be substantially less than that of a single framework structure of the type heretofore employed. Nevertheless, it will be apparent that the safety, stability and operating advantages incident to the form and configuration of the present invention may be attained when using other forms, types and constructions in the framework of each or any envelope in the assembly.

Figure 9:
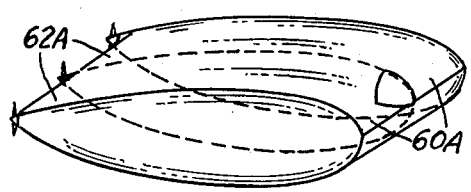
FIG. 9 is a perspective illustrating an alternative embodiment of the present invention.

The construction and arrangement of the envelopes in the airship may be varied considerably depending upon the function and flight characteristics desired. In a similar way, the contour of the airship may be varied. Thus, in order to present an improved and aerodynamically "clean" contour, the airship may have larger fillets 60A and 62A as shown in FIG. 9 so that the upper and lower surfaces thereof merge with the upper and lower surfaces of the hulls themselves to present a single smooth and continuous airfoil surface throughout the width of the airship.

Figure 10:
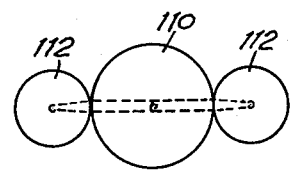
FIGS. 10, 11 and 12 are diagrammatic illustrations of further alternative embodiments of the present invention.

In the alternative, if desired, the three envelopes need not all be of the same size or shape. Accordingly, as shown in FIG. 10, the central hull 110 of the airship may be longer and larger in diameter than the two outer hulls 112 whereby the assembly may have an over-all configuration approaching that of a flying wing.

It will also be apparent that the framework assembly of all envelopes need not be the same. Thus, the outer envelopes 112 may each have a framework assembly of the character described above whereas the central envelopes 110 may be essentially a non-rigid envelope supported between the outer rigid envelopes 112 and embodying little, if any, framework structure. In a similar way, of course, the central envelope 110 may have a rigid framework to which outer envelopes 112 of a non-rigid or semi-rigid construction are secured.

Figure 11:
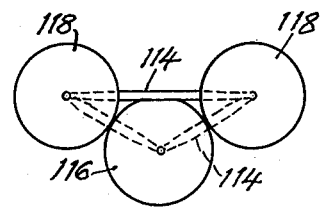

In these assemblies wherein greater strength and rigidity is desired, the airship may be of the type illustrated diagrammatically in FIG. 11. As there shown, transversely extending cross beams 114 may be connected together in the form of a triangle and the envelopes 116 and 118 need not be arranged in a single plane. Constructions of this type also are characterized by their improved stability in that the center of load is below the center of buoyancy of the airship. Further, as indicated above with reference to FIG. 10, either the central envelope 116 or the two outer envelopes 118 may be non-rigid or semi-rigid and embody a minimum of framework structure. At the same time, the framework of the central envelope 116 may be provided with a relatively heavy and rigid hull structure or be otherwise constructed and employed in the assembly.

In each of the forms of the invention shown and described above, the load may be supported largely, if not solely, from the cross beams employed and extending from one envelope to another. The control cabin and the space for passengers and freight loads are preferably housed within the central envelope as represented by the cabin shown at 120 in FIG. 3. Nevertheless, the cabins and stowage areas may also be arranged in whole or in part in the outer envelopes of the airship and they may, of course, be arranged below the envelopes on the exterior thereof or partly within and partly on the exterior of the envelopes as indicated at 122 in FIG. 3 or as desired in any particular design or application of the invention.

The envelopes of the airship contain the gas cells 58 for receiving and holding buoyant gas for raising and sustaining the airship in flight. Any desired number and arrangement of such gas cells may be employed and, certain of such cells may contain combustible gas for use in the engine used to propel the airship although such practice is not recommended. It also should be understood that the gas may be pumped from one cell to another or from one envelope to another and may be heated or cooled to aid in controlling and operating the airship and increasing the stability thereof. Each cell preferably is provided with a vent valve or safety device as indicated at 124.

Figure 12:
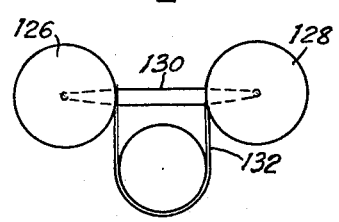
Figure 8:
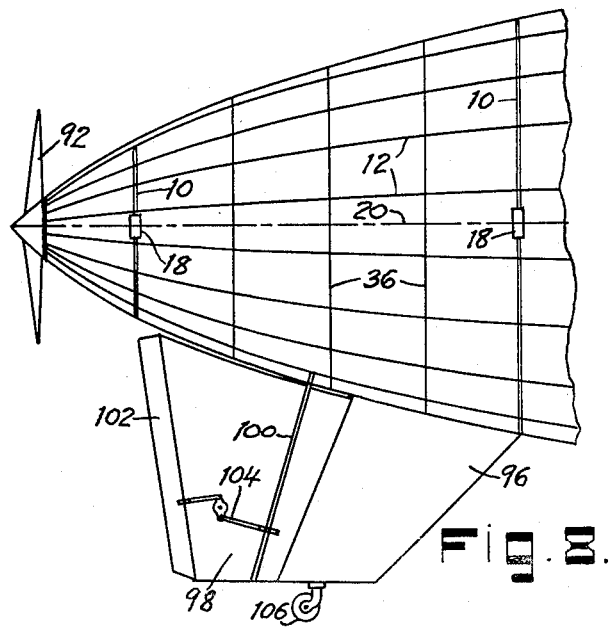
FIG. 8 is a side elevation of the stabilizing fin and rudder assembly of the airship shown in FIGS. 1 to 7.

In that form of the invention illustrated in FIG. 12, the airship is provided with two spaced envelopes 126 and 128 which are held in the desired spaced relation by transversely extending cross beams 130. The assembly, thus, is in effect similar to a catamaran providing an open space between the envelopes 126 and 128 in which a load may be positioned by cables or the like as shown at 132.

Constructions of the type shown in FIG. 12 are of particular advantage in the transportation of large or special loads or assembled objects such as large missiles, locomotives, bridge or building assemblies, or the like. The load, while bulky, can still be handled effectively and supported in the space between the gas-containing envelopes without danger of shifting or destroying the equilibrium or stability of the airship.

While the framework assemblies employed in producing lighter-than-air craft in accordance with the present invention are preferably constructed as herein described, any other suitable or preferred type of framework structure may be employed and the framework for any one or more of the hulls may embody a longitudinally extending kul or kuls if desired.

It will, thus, be seen that construction embodying the present invention may assume many different forms and are subject to wide variation and flexibility of design to adapt the aircraft for particular or highly specialized uses and operating conditions. Moreover, the present invention is capable of utilizing the unique advantages of both rigid and non-rigid or semi-rigid airships by reason of its use of a plurality of envelopes in a unitary assembly. The number of envelopes employed in the airship, the type of framework structure employed and the shape, design and method of propulsion of the airship are capable of many changes and modifications. In view thereof, it should be understood that the particular embodiments of the invention shown in the drawings and described above are intended to be illustrative only and are not intended to limit the scope of the invention.

What is claimed is:

1. A rigid type lighter-than-air craft embodying a plurality of elongated hulls, each of which hulls has a framework therein including longitudinally spaced ring assemblies centered with respect to the longitudinal axis of the hull, at least a portion of said ring assemblies having a load supporting element carried thereby and located adjacent said longitudinal axis, and connecting means extending transversely of said hulls from the axis of one hull to the axis of another and secured to the load supporting elements of ring assemblies in different hulls.

2. A rigid type lighter-than-air craft comprising a plurality of elongated hulls having their longitudinal axes parallel, said hulls each having a framework including ring assemblies with load supporting means connected thereto and located adjacent the longitudinal axes of the hull, cross beams extending at right angles to the longitudinal axes of said hulls, said cross beams being secured to said ring assemblies and to the load supporting means adjacent the axes of said hulls.

3. A rigid type lighter-than-air craft having a plurality of elongated hulls with their longitudinal axes being in a common horizontal plane, each of said hulls having a framework including ring assemblies lying in common vertical planes extending transversely of said longitudinal axes, members located adjacent said axes of the hulls and connected to the ring assemblies by tension elements, and connecting members extending from one of said hulls to another along the line of intersection of said vertical plane with said horizontal plane and connected to the members located adjacent the axes of different hulls.

4. A rigid type lighter-than-air craft comprising a plurality of elongated hulls having their longitudinal axes parallel, each of said hulls having a framework including a plurality of longitudinally spaced ring assemblies extending at right angles to said longitudinal axes, ring assemblies in adjacent hulls of the aircraft being located in common longitudinally spaced vertical planes, a peripheral portion of at least one of said ring assemblies in each of said hulls being in contact with and connected to a peripheral portion of a ring assembly in another of said hulls, and means connected to the framework of all of said hulls restricting longitudinal and transverse movement of said hulls with respect to each other.

5. A rigid type lighter-than-air craft comprising a plurality of elongated hulls having their longitudinal axes parallel, each of said hulls having a framework including a plurality of longitudinally spaced ring assemblies extending at right angles to said longitudinal axes, ring assemblies in adjacent hulls of the aircraft being located in common longitudinally spaced vertical planes, a peripheral portion of at least one of said ring assemblies in each of said hulls being secured to a peripheral portion of a ring assembly in another of said hulls, and cross beams located at the intersections of said vertical planes with a horizontal plane containing said longitudinal axes, said cross beams being connected to the framework of each of said hulls and serving to hold said hulls in substantially fixed relative positions.

6. A rigid type lighter-than-air craft comprising a plurality of elongated hulls having their longitudinal axes lying in a common horizontal plane, each of said hulls having a framework including a plurality of ring assemblies spaced apart longitudinally of the hull and positioned at right angles to the longitudinal axis thereof, said ring assemblies further including radially extending tension members connected to a common element located adjacent the longitudinal axis of the hull, at least a portion of the ring assemblies in adjacent hulls of the aircraft being located in common longitudinally spaced vertical planes normal to said common horizontal plane, and cross beams extending transversely of the longitudinal axes of said hulls at the intersection of said common vertical planes with said common horizontal plane, said cross beams being connected to the common elements adjacent the longitudinal axis of each of said hulls.

7. A rigid type lighter-than-air craft comprising a plurality of elongated hulls having their longitudinal axes lying in a common horizontal plane, each of said hulls having a framework including a plurality of ring assemblies spaced apart longitudinally of the hull and positioned at right angles to the longitudinal axis thereof, said ring assemblies further including radially extending tension members connected to a common element located adjacent the longitudinal axis of the hull, at least a portion of the ring assemblies in adjacent hulls of the aircraft being located in common longitudinally spaced vertical planes normal to said common horizontal plane, and cross beams extending transversely of the longitudinal axes of said hulls at the intersection of said common vertical planes with said common horizontal plane, said cross beams being connected to the common elements adjacent the longitudinal axis of each of said hulls and to peripheral portions of those ring assemblies lying in a common vertical plane.

8. A rigid type lighter-than-air craft embodying three elongated hulls having their longitudinal axes located in a common horizontal plane, so as to present a central hull and two outer hulls located adjacent and in contact with said central hull, each hull being substantially circular in cross section and increasing in diameter from the ends toward an intermediate portion of maximum diameter, each hull having a framework including a plurality of longitudinally spaced ring assemblies lying in vertical planes extending at right angles to the longitudinal axes of said hulls, peripheral portions of the ring assemblies located in the intermediate portions of said hulls where the hulls are of maximum diameter being in contact with and fixedly secured together, and cross beams extending transversely of said hulls at the intersection of said vertical planes with said common horizontal plane, said beams passing through the central hull and having the opposite ends thereof connected to the ring assemblies of the outer hulls to hold the hulls in substantially fixed relative positions.

9. A rigid type lighter-than-air craft as defined in claim 8 wherein each ring assembly has radially extending tension members connected to load supporting means located adjacent the longitudinal axis of the hull and said cross beams are connected to said load supporting means.

10. A rigid type lighter-than-air craft comprising a plurality of elongated hulls positioned with their longitudinal axes parallel, each of said hulls having a framework embodying ring assemblies positioned at right angles to the longitudinal axis of the hull, radially extending means carried by said ring assemblies and serving to divide the hulls into a plurality of longitudinally adjacent chambers, the radially extending means of each ring assembly being connected to a common member located adjacent the axis of the hull, cells for buoyant gas located in said chambers, and cross beams extending transversely of the aircraft from one of said frameworks to the others and positioned between the gas cells in said chambers, said cross beams being connected at their ends to the common members located adjacent the axes of different hulls of said lighter-than-air craft.

11. A rigid type lighter-than-air craft comprising three elongated hulls arranged in parallel relation with the longitudinal axes of said hulls located in a common horizontal plane, each of said hulls having a framework including a plurality of ring assemblies held in longitudinally spaced relation by longerons, each of said ring assemblies having radially extending tension members connected to elements of the ring assemblies located near the periphery of the ring assemblies and to concentration rings located adjacent the longitudinal axis of the hull, said ring assemblies and tension members serving to divide each hull of the aircraft into a plurality of longitudinally adjacent chambers, cells for buoyant gas located in at least a portion of said chambers, and cross beams holding said hulls in substantially fixed relative positions, said cross beams extending transversely of said hulls in said common horizontal plane with the central portions of the cross beams connected to the concentration rings adjacent the longitudinal axis of the central hull of the aircraft and with the opposite end portions of said cross beams connected to the concentration rings of the outer hulls of the aircraft.

12. A rigid type lighter-than-air craft as defined in claim 11 wherein the aircraft has an aspect ratio of about 1.0 to 0.3.

13. A rigid type lighter-than-air craft as defined in claim 11 wherein an outer envelope extends about the framework of said hulls and the aircraft has a transverse vertical cross section which is of greater width than height.

14. A rigid type lighter-than-air craft as defined in claim 11 wherein propulsion means are located in substantial alignment with the longitudinal axis of at least one of said hulls.

15. A rigid type lighter-than-air craft embodying a plurality of elongated hulls, each of which is provided with a framework including ring-like assemblies and longerons, said hulls being arranged with their longitudinal axes parallel, at least a portion of said ring assemblies being provided with a member located adjacent said longitudinal axis and connected to the ring assembly by tension elements, and means holding said hulls in substantially fixed relative positions comprising a plurality of beams extending transversely with respect to said longitudinal axes and having one end thereof connected to the member located adjacent the longitudinal axis of one of said hulls and the other end thereof connected to the member located adjacent the longitudinal axis of another of said hulls.

16. A rigid type lighter-than-air craft comprising three elongated hulls arranged with their axes in a common horizontal plane so that one of said hulls is a central hull located between two adjacent outer hulls, each of said hulls having a framework including a plurality of ring-shaped assemblies positioned in planes normal to the axis of the hull and provided with load supporting means positioned adjacent the axis of the hull and connected to said ring-shaped assemblies by tension elements, beams extending transversely of the axes of said hulls and serving to hold the hulls in substantially fixed relative positions, said beams extending through and beyond the central hull and into the outer hulls, the beams being connected to the load supporting means adjacent the axis of each of said hulls.

17. A rigid type lighter-than-air craft as defined in claim 16 wherein the front and rear ends of said hulls are tapered to points adjacent the longitudinal axis of the hull and the spaces between the hulls adjacent at least one end thereof are occupied by fillets which are symmetrical with respect to the common plane including the axis of said hulls.

18. A lighter-than-air craft as defined in claim 17 wherein the depth of the fillets located adjacent the front ends of said hulls increases gradually from a leading edge rearwardly, and the fillets adjacent the rear ends of said hulls decrease in depth rearwardly to a trailing edge, the upper and lower surfaces of said fillets enclosing said transversely extending beams and cooperating to present substantially smooth and continuous curving upper and lower airfoil surfaces extending substantially the full length of said hulls.

References Cited by the Examiner
UNITED STATES PATENTS

| | | | |
|---|---|---|---|
| 43,449 | 7/64 | Andrews | 244—30 |
| 648,634 | 5/00 | Roze | 244—30 |
| 889,693 | 6/08 | Lake | 244—30 |
| 1,228,159 | 5/17 | Zipperstein | 244—25 |
| 1,343,428 | 6/20 | Berry | 244—30 |
| 1,608,822 | 11/26 | Silver | 244—25 |
| 1,658,876 | 2/28 | Arnstein | 244—128 |
| 1,686,130 | 10/28 | Hall | 244—25 |
| 1,833,033 | 11/31 | Ortega | 244—25 |
| 2,778,585 | 1/57 | Tschudy | 244—30 |

FERGUS S. MIDDLETON, *Primary Examiner.*